Dec. 8, 1959          B. G. COPPING          2,916,133

METHOD OF AND APPARATUS FOR SORTING ARTICLES SUCH AS CANS

Filed Oct. 1, 1956          5 Sheets-Sheet 1

INVENTOR.
BRUCE G. COPPING
BY
*Oldham & Oldham*
ATTYS.

Dec. 8, 1959  B. G. COPPING  2,916,133
METHOD OF AND APPARATUS FOR SORTING ARTICLES SUCH AS CANS
Filed Oct. 1, 1956  5 Sheets-Sheet 2
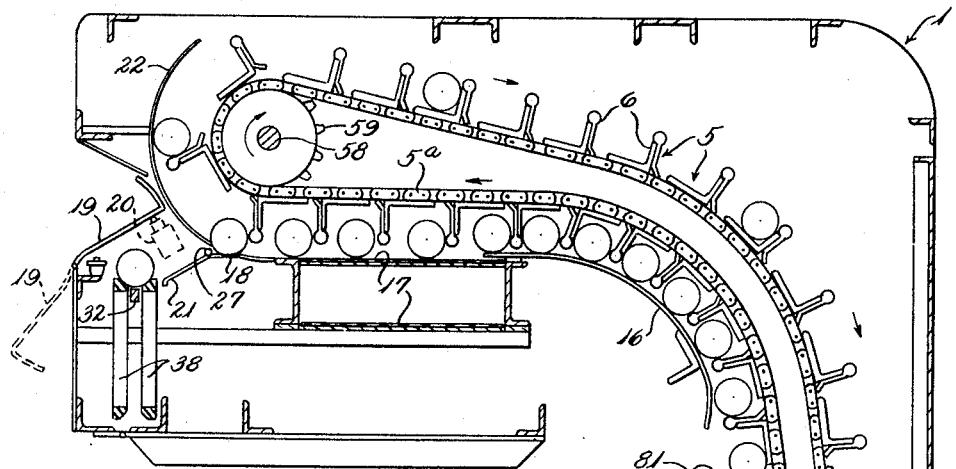
FIG. 2
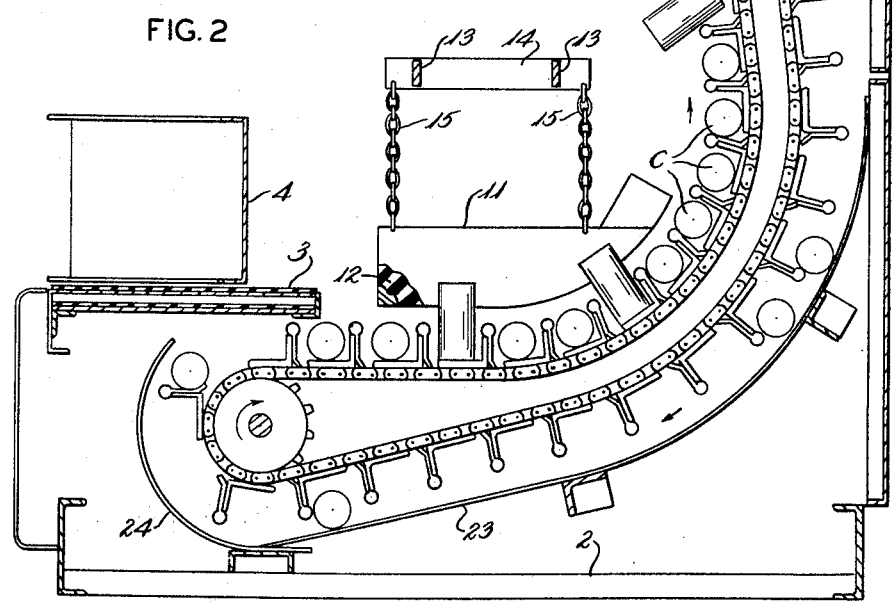
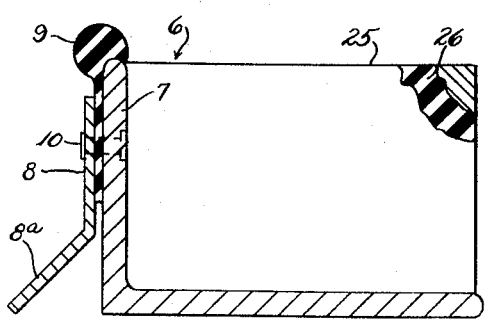
FIG. 5
INVENTOR.
BRUCE G. COPPING
BY
Oldham & Oldham
ATTYS.

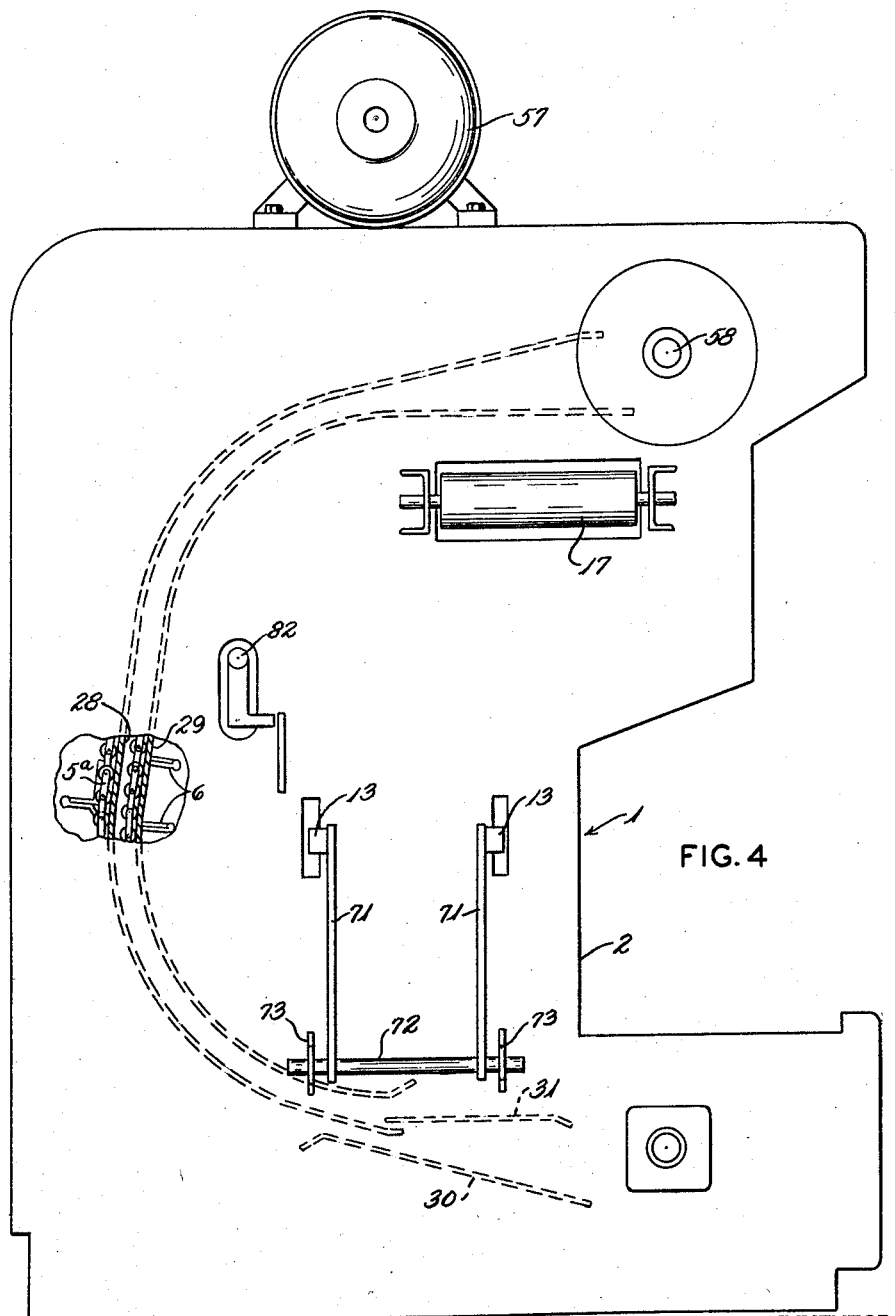

Dec. 8, 1959   B. G. COPPING   2,916,133
METHOD OF AND APPARATUS FOR SORTING ARTICLES SUCH AS CANS
Filed Oct. 1, 1956   5 Sheets-Sheet 5
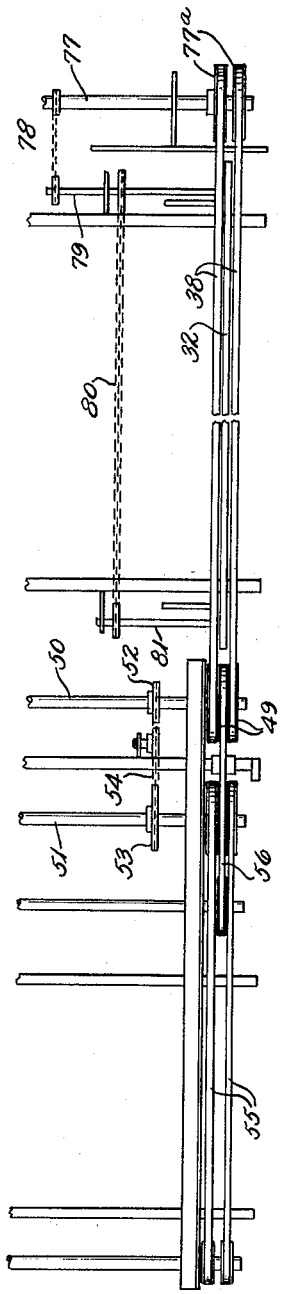
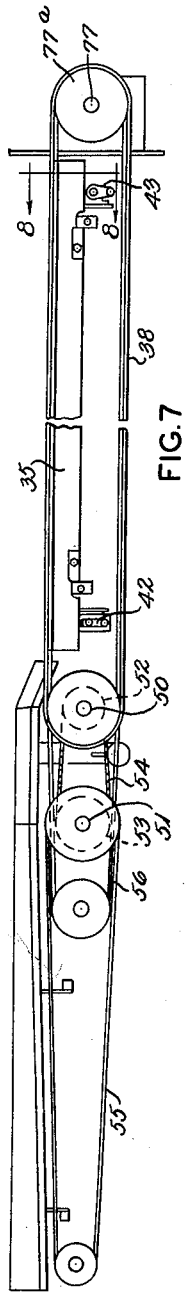
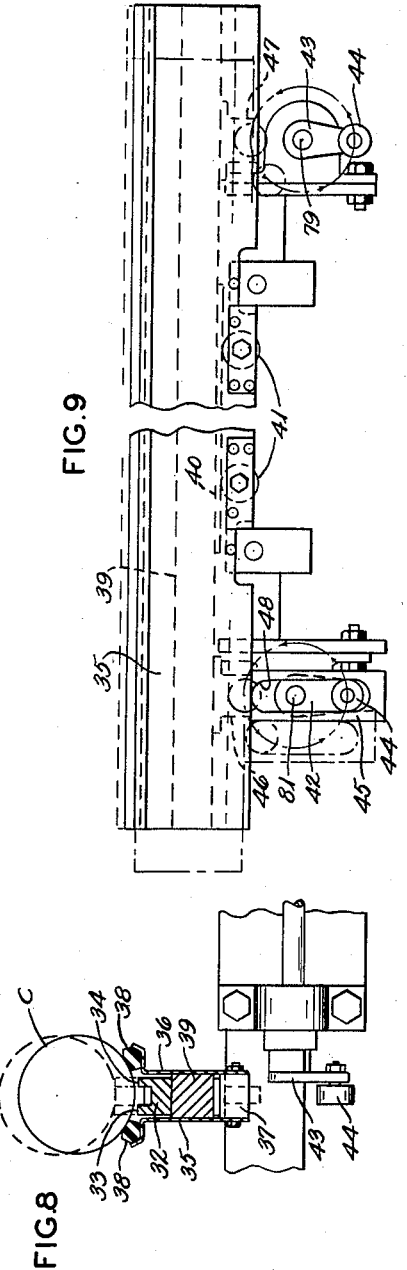
INVENTOR.
BRUCE G. COPPING
BY
Oldham & Oldham
ATTYS.

United States Patent Office 2,916,133
Patented Dec. 8, 1959

2,916,133
METHOD OF AND APPARATUS FOR SORTING ARTICLES SUCH AS CANS

Bruce G. Copping, Akron, Ohio, assignor to Atkron, Inc., Cuyahoga Falls, Ohio, a corporation of Ohio Application October 1, 1956, Serial No. 613,109

28 Claims. (Cl. 198—30)

This invention relates to the sorting and positioning of articles such as cans in predetermined positions, and especially to methods of and apparatus for taking randomly positioned articles fed to the machine and discharging them in axially aligned, abutting relation.

Normally can manufacturers ship new tin cans to the users of the cans in either cardboard cartons, burlap bags, or other bulk containers. The canneries receive these new cans, open the containers therefor, and then have to manually process the new tin cans and stack them in, or feed them to, suitable apparatus to assure that the open ends of the cans are upright and that the cans are lined up properly in single file on a conveyor belt, or other apparatus which will be used to carry them to the filling machines. Inasmuch as nearly all canneries use thousands of cans a day when in operation, it will be seen that it is a tedious, costly and difficult operation to take these new cans and arrange them properly for feed to the can filling apparatus.

Some efforts have been made heretofore to provide can sorting apparatus to replace the manual sorting and positioning of cans as has been heretofore rather widely practiced in canneries and other can filling operations. However, some of such apparatus provided heretofore has been quite costly, while some can sorting apparatus has been very bulky and has occupied a large volume of factory space, and some apparatus has not processed the cans safely and rapidly, or has been otherwise objectionable.

It therefore is a general object of the present invention to provide a compact, efficient apparatus for processing a plurality of magnetic metal cans, or similar articles fed at random thereto and discharged from the apparatus in abutted, axial alignment.

Another object of the invention is to provide a novel method for handling metal cans or similar articles to automatically position the cans in desired axially aligned, end abutting positions and to process a large number of cans safely and rapidly.

Yet another object of the invention is to provide an apparatus of the class described wherein the apparatus can transpose cans from movement normal to their axes to movement along their axes by use of a magnetic catcher bar in combination with a pair of carrier belts for moving the cans along their axes and to maintain the cans in the same relative positions while effecting such action on the cans.

Still another object of the invention is to provide apparatus of the class described wherein the apparatus is adapted to position a large number of cans or similar articles horizontally (on their sides) on a conveyor support rapidly, by means of a plurality of reciprocating, swinging flails.

Yet another object of the invention is to provide apparatus of the class described including means for lifting articles by a plurality of parallel flights positioned by endless conveyor means to have an inverted C-shaped path and to pull off improperly positioned articles on the flights by gravity at a desired point in the path of movement of the conveyor flights.

A further object of the invention is to provide apparatus of the class described and providing relatively long carrier flights for cans or similar articles, to place cans thereon at random, but in axial alignment, to concentrate cans at corresponding ends of the carrier flights, to discharge a predetermined maximum number of cans from any one flight, and to carry any excess cans in a flight around the apparatus for another passage cycle therethrough whereby cans can be discharged at a uniform rate.

Another object of the invention is to provide apparatus and methods for sorting magnetic metal cans, or similar articles and wherein the apparatus has satisfactory safety mechanisms therein for shutting off the machine automatically in case any of the articles being processed are improperly positioned and to take such action rapidly to prevent damage to the articles being processed.

Another object of the invention is to provide article sorting apparatus wherein a plurality of different individually driven members are provided in the apparatus but with the different members of the apparatus all being driven at correlated speeds for processing a plurality of articles therein for discharge in a desired manner, by means of unitary power supply properly connected to the driven members of the apparatus.

Other objects of the invention are to discharge axially aligned and abutted articles from a lifting conveyor by movement normal to their axes, to grasp such cans or similar articles by magnetic means to insure retention thereof in axially aligned and abutted positions, to remove the discharged axially abutted articles from the magnetic means by rapidly moving belt means, to transfer the rapidly moving axially abutted cans or other articles onto a slower moving belt system for discharge from the apparatus, to discharge cans from the machine at a relatively uniform rate, and to provide flight means in an endless article lifting carrying conveyor of the apparatus of desired shape and contour for safe engagement with and passage of articles through the apparatus without damage thereto.

The foregoing and other objects and advantages of the invention will be made more apparent as the specification proceeds.

For a better understanding of the invention, attention is directed to the accompanying drawings wherein one currently preferred embodiment of the principles of the invention is shown, and wherein:

Fig. 2 is a vertical sectional elevation taken on line 2—2 of Fig. 1;

Fig. 4 is a left side elevation of the apparatus of Fig. 1 with the cover plate thereon removed;

Fig. 5 is an enlarged vertical section of a flight on an endless article lifting conveyor of the apparatus;

Fig. 6 is a fragmentary plan view showing the means at the discharge end of the apparatus of Fig. 1 for receiving cans from the lifting portion of the apparatus and moving them in an axial direction for discharge;

Fig. 7 is a front elevation of the apparatus of Fig. 6;

Fig. 8 is a fragmentary vertical section taken on line 8—8 of Fig. 7; and

Fig. 9 is an enlarged front elevation of the magnet bar portion of the apparatus of Fig. 8.

When referring to corresponding parts shown in the drawings and referred to in the specification, corresponding numerals are used to facilitate comparison between such equivalent parts.

The present invention in general relates to apparatus and method for sorting magnetic tin cans or similar articles and positioning them in end alignment and abutting relationship for further processing or discharge. This apparatus comprises endless driven conveyor means having a plurality of spaced parallel article lifting and carrying flights thereon, means positioning the conveyor in a generally reversed C-shape for movement therearound in a predetermined path, means for depositing articles at random on the conveyor at a lower but inner portion thereof, reciprocating flail means for contacting and moving articles on the conveyor and not lying down intermediate adjacent flights thereon to attempt to so position such articles, means for retaining properly laid articles on the article carrying flights as the conveyor advances upwardly into an overhanging position, means for concentrating articles carried by or intermediate adjacent flights on the conveyor into aligned and end abutting relation at a predetermined point in the path of movement of the conveyor, and means for receiving concentrated, aligned, end abutted articles from the conveyor as discharged therefrom, the conveyor and retaining means cooperating to permit the following flight to push end abutted articles in a direction normal to the article axes onto the receiving means for automatic discharge from the apparatus.

*Article arranging and conveying apparatus*

Figure 1:
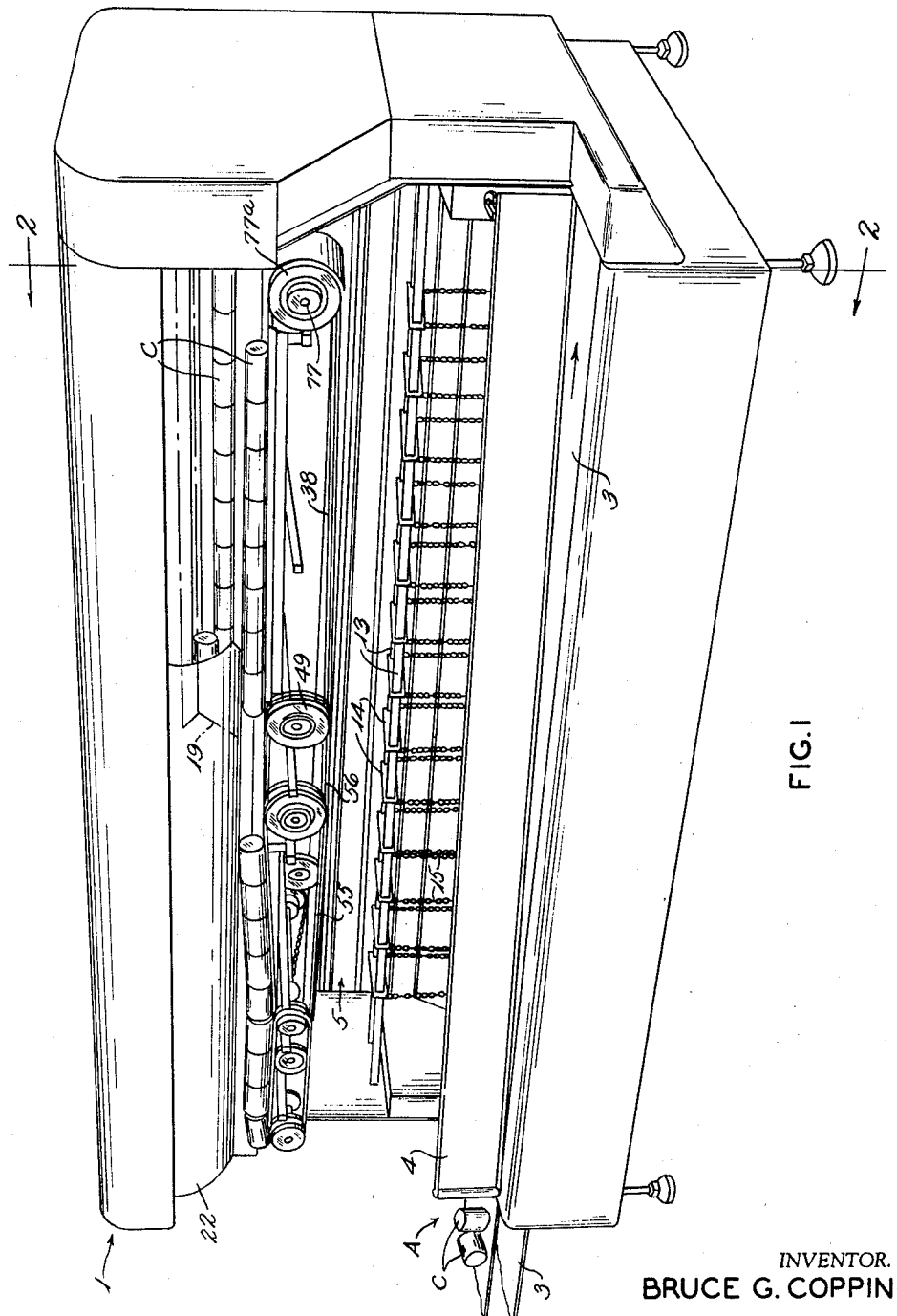
Fig. 1 is a perspective view of article sorting apparatus of the invention.

Attention particularly now is directed to Figs. 1 and 2 of the accompanying drawings which show the article sorting and aligning apparatus of the invention, which apparatus is indicated as a whole by the numeral 1. It should be realized that the apparatus of the invention can be used, with or without minor modifications, for processing other articles, such as non-magnetic metal cans, or cylindrical paper or cardboard containers, but the invention will, in general, be described hereinafter as processing magnetic so-called "tin" cans.

The apparatus 1 has a suitable frame 2 provided therefor and an endless conveyor 3 is horizontally positioned on the frame and extends substantially the length of the apparatus 1 at the lower or input section provided therein. The conveyor 3 is suitably positioned by conventional means for movement in a horizontal plane and is driven in a conventional manner by means hereinafter described in more detail. The conveyor 3 has an article guide 4, which may comprise an elongate sheet metal channel, positioned above its upper surface and extending at an angle with relation thereto to diverge or incline inwardly of the apparatus 1 from the input end of the conveyor 3 to the output end thereof. It will be seen that this conveyor 3 is relatively wide and is adapted to have a plurality of cans C deposited in random fashion at the input end of such conveyor (and apparatus) indicated at A in Fig. 1, which conveyor may protrude slightly from the remainder of the apparatus.

As an important feature of the present invention, the article sorting and aligning apparatus 1 of the invention includes an endless lifting and carrying conveyor 5 in this instance made from a pair of endless edge chains 5a which have a plurality of article supporting and positioning flights 6 secured to and extending between the edge chains 5a in spaced parallel relationship. These flights 6, as best shown in Fig. 5 of the drawings, are made of any suitable components and include right angle metal angles 7 that have lifter obtuse secondary metal angles 8 secured to the back portion thereof and having sections 8a extending forwardly and downwardly therefrom. Preferably some type of a rubber, or resilient rubber-like beading 9 is provided and it may be secured in position on the upper ends of the angles 7 by rivets 10 used to secure the angles 7 and 8 together in back to back relation. Thus, in all events, a part of this rubber or resilient beading 9 extends over an edge of the angle 7 and extends upwardly therefrom to provide a cushion member on the flight to protect any articles being processed in the apparatus 1 as moved around therein by means of the conveyor flights 6. These angles 7 are such as to receive the cans C being sorted thereon and between a pair of adjacent flights 6, but with the angles 8 and sections 8a thereof being adapted to engage and carry the cans C at certain portions of movement of this conveyor 5, as shown in Fig. 2 of the drawings. The endless conveyor 5 is arranged in what may be termed inverted, or reversed C-shape and the conveyor is driven to move continuously around such path in the directions indicated when the apparatus 1 is in operation.

As the conveyor 3 moves along its path, the guide 4 continuously forces some of the cans C over to fall onto the inner, but lower portion of the path of movement of the conveyor 5. Such cans C are, of course, arranged at random and some may immediately assume a position lying down intermediate to a pair of the adjacent flights 6, whereas some of the cans C will stand on their ends, or be otherwise positioned on the conveyor 5. Thus, Fig. 2 best shows that a plurality of flails 11 may be positioned directly above the conveyor 5 at the inner, but lower path of movement thereof but spaced therefrom slightly. Such flails 11 may comprise sheet metal plates which have some suitable coating or rubber, or other resilient rubber or rubber-like material or plastic material 12 thereon. The flails 11 preferably are flexibly or movably suspended from carrier rods 13, as by means of bars 14 that are carried by the rods 13 and which have pairs of chains 15 suspending the flails 11 therefrom at desired spaced axial positions on the rods 13. These rods 13 extend transversely of the conveyor 5 and are suitably reciprocated by means to be described hereinafter in more detail. This movement provided for the flails 11 will cause a shaking or swinging movement in the flails 11 to strike any cans in their paths and endeavor to knock the cans C into position lying on one of the flights 6. The entire length of any given flight 6 will be covered by the moving flails repeatedly as the conveyor 5 moves through its path to position several different flights 6 continually in association with the flails 11.

These flails 11 are relatively heavy with relation to the weight of the cans C and they give the cans quite an impact to cause the cans to tend to move down between a pair of the flights 6. Thus a high percentage of the cans C are in the desired horizontal positions intermediate pairs of adjacent flights 6 before the conveyor 5 moves these cans out of the range of the flails 11. The heights of the angles 7 are so correlated with relation to the length of the cans C to be processed in the apparatus 1, that normally any can positioned vertically, rather than horizontally on one of the flights 6, will tend to fall therefrom by gravity action as the conveyor moves vertically upwardly in its orbit and inwardly at a slight angle of about 8°. One of such cans falling from the conveyor is shown in Fig. 2.

As the conveyor 5 continues its upward movement from the flails 11, and starts to move into the overhanging portion of the inverted C-shaped path, a guide plate 16 is provided for the lower length of the conveyor 5 to retain the cans C from falling out intermediate the pairs of adjacent flights 6, all as again best shown in Fig. 2 of the drawings.

*Article concentrating means*

It will be realized that the cans C positioned intermediate a pair of the flights 6 upon one of the angles 7 will be placed on random portions of each of the flights 6 and with the cans C usually being appreciably spaced on the flights. Usually only between 40 to 80% of the length of the flights 6 are actually occupied by the cans C, depending on the rate of feed of cans to the apparatus. Thus in order to facilitate delivery of cans from the flights 6 and to aid in insuring uniform discharge of cans, the invention provides means in the apparatus for concentrating the cans C on a flight into end to end abutting contact thereon. To this end, a driven relatively wide, rubberized or fabric endless collector belt 17 is provided at the upper end of the guide plate 16. This collector belt 17 is carried by suitably positioned and driven means, hereinafter described, so that the belt 17 is positioned immediately adjacent and below the overhanging portion of the path of the conveyor 5 as it reaches the upper and forward end of its travel. It should be noted that the collector belt 17 is almost as wide as the distance between about four of the flights 6 and that the belt moves longitudinally of the flights 6. The collector belt 17 has one lateral margin thereof positioned under and immediately adjacent the guide plate 16 so that any cans that are positioned intermediate a pair of the flights 6 and are being moved along the surface of the guide plate 16 by the conveyor 5 will smoothly roll or fall onto the top surface of the collector belt 17 as the conveyor 5 moves into superimposed relationship to such belt. The apparatus 1 is so constructed and arranged that the collector belt 17 moves with sufficient speed as to move any and all cans C intermediate a pair of the flights 6 down to one end of such flights while the cans are engaged by the collector belt 17 and are being moved laterally thereover by movement of the conveyor 5.

From the collector belt 17, the cans C are moved onto and supported by a discharge plate 18 provided at the opposite end of the apparatus 1 from the input end A thereof. Such discharge plate 18 normally is of substantially the same length as a safety cover 19 hingedly secured to part of the frame 2 and overlying a discharge area of the apparatus 1, as hereinafter described. This safety cover 19 is adapted to bear against a limit switch 20, or similar member carried on the frame 2 so that as long as such safety cover 19 is closed, the machine can operate in accordance with desired conventional controls provided therefor. However, such switch 20 is connected in the control circuits for the drive means for the apparatus 1 in such a manner that when the switch 20 is opened by removal of the safety cover 19 from contact therewith, as by cans C piling up against the cover and pushing it up, such switch 20 cuts off operation of the apparatus 1 as well as any companion apparatus that may be provided for feeding cans automatically to the apparatus 1.

It will be seen that the cans C reaching the discharge plate 18 are moved laterally thereover in a direction normal to the axes of the cans C by the beading 9 of the conveyor flights 6 which is still engaged therewith. The discharge plate 18 terminates in a downwardly inclined lip 21 which leads to certain means for receiving the cans C and engaging the cans as discharged from the lip 21 to stop movement thereof in a direction normal to the axes of the cans, and to start movement promptly of the cans in an axial direction without any relative movement of the cans.

Figs. 1 and 2 of the drawings best show that there is an arcuate return plate 22 provided at the upper and forward end of the path of movement of the conveyor 5. Such return plate 22 only extends a portion of the length of the apparatus 1 from the input end A thereof and terminates at the discharge zone in the apparatus 1 wherein the discharge plate 18 permits the cans C to be discharged from the conveyor 5. The return plate 22 is of proper arcuate shape and is so positioned in relationship to the conveyor 5 as to retain cans thereon for further processing in the apparatus to move with the conveyor 5 through another cycle of movement thereof. Hence, any cans C upon the conveyor 5 and not reaching the discharge plate 18 by axial movement along one of the conveyor flights 6 will be retained in engagement with the conveyor 5 for movement therealong and the flights 6 will hold such cans in engagement therewith as the conveyor starts the outward and downward portion of its path of movement. Auxiliary guide plates 23 and 24 are provided at the lower portion of the path of movement of the conveyor 5 for retaining cans C thereon until the flights are so positioned, as shown in Fig. 2, as to retain the cans thereon by gravity. It will be realized that any and all cans carried upon any given flights 6 will be discharged therefrom should such number of cans carried thereby not exceed the length of the discharge plate 18 provided in the apparatus.

Each of the flights 6 has an end plate 25 secured to the end of the flight 6 passing by the discharge plate 18. Such end plate 25 usually has a suitable resilient, or plastic cover 26 provided thereon, which cover may be of sponge rubber, or other suitable material, to avoid damage to the cans C striking such end plate 25 when moved thereagainst by the collector belt 17. Obviously the collector belt 17, for efficiency of the operation of the apparatus 1, must move relatively rapidly for its can concentrating action and to provide for discharge of a large number of cans from the apparatus in a unit of time.

The discharge plate 18 preferably has a stop ridge, or rib, 27 provided thereon, which rib or ridge may be of any desired height in the apparatus and serves to stop the movement of the cans C onto the lip portion 21 of such discharge plate. However, as the conveyor 5 continues to move through its given path, the beading 9 or other portions of the flight forces cans C in engagement with the stop rib 27 over it to cause them to roll down the discharge lip 21 onto suitable receiving means provided therefor. By providing this stop rib 27, it insures that the cans C will be lined up nicely before they are pushed out of the apparatus for discharge therefrom.

It should be realized that, by limiting the amount of cans discharged from any flight 6, and normally having a maximum number of cans discharged from each flight of the conveyor 5 as it rotates at a uniform rate, the cans processed by the apparatus 1 will usually be discharged therefrom at a uniform rate and maximum efficiency can be realized by discharge of an increased average number of cans per flight.

Fig. 4 best shows that the conveyor 5 is held in its desired position by means of a pair of chain guide plates 28 and 29, which are roughly of C-shape, provided at each edge of the conveyor 5 to position it and the cross flights thereon in a desired manner. End guide plates 30 and 31 are also provided at a lower front portion of the apparatus to aid in maintaining this conveyor 5 in desired position.

*Article receiving apparatus for discharge action*

As the plurality of cans being processed in the apparatus of the invention are discharged from the conveyor 5 in aligned, end abutting relation, it is quite important that means be provided for engaging these cans while moving transversely to their longitudinal axes and preparing the cans for movement in a direction along their axes. To this end, a magnet bar 32, Fig. 8, is provided in the apparatus 1 and it is movably positioned, as hereinafter described in more detail, on the frame 2. The magnet bar 32 has a pair of transversely spaced poles 33 and 34 provided on its upper surface and extending the length thereof. These poles 33 and 34 are adapted to engage with spaced portions on the periphery of cans C being processed in the apparatus to secure the cans thereto.

The magnet bar 32 is positioned intermediate a pair of stainless steel belt support brackets 35 and 36 which have spacers 37 secured therebetween to aid in positioning the brackets in desired spaced, but aligned, relationship and with the bracket assembly being suitably secured to the frame 2 of the apparatus at the discharge plate 18. These brackets 35 and 36 are adapted to engage with a pair of spaced discharge belts 38, one of which is positioned on each side of the magnet bar 32 and with the brackets 35 and 36 positioning the belts 38 in fixed vertical relataionship to the magnet bar and the remainder of the apparatus. The magnet bar 32 has a suitable non-magnetic base member or bar, such as a brass bar 39 suitably secured thereto, which brass bar 39 has hardened steel or other hard metal wear plates 40 secured to longitudinally spaced portions thereof. Suitable bearings 41, carried by the frame 2 of the apparatus, are provided to engage the wear plates 40 and support the magnet bar assembly for reciprocating motion in the apparatus 1 of the invention, as hereinafter described in more detail.

It is an important feature of the invention, that the magnet bar 32 and associated means is provided with limited vertical movement in the apparatus and with movement arcuately forwardly with relation to the travel of the belts 38. Vertical movement for the magnet bar 32 and associated means is provided by means of a pair of rotated crank arms 42 and 43 carrying rollers 44 at the radially outer ends thereof. The one crank arm 42 connects to the magnet bar 32 by a guide plate 45 secured to or carried by an end block 46 suitably secured to the magnet bar at one end thereof. A similar end block 47 is secured to the opposite end of the under surface of the brass bar 39 and the rollers 44 are adapted to engage these end blocks 46 and 47 at the upper portion of movement of these crank arms. The rollers 44 may be of sufficient axial length as to engage with a slot 48 in the guide plate 45 and with the end block 46 also, or other means may be journalled on the roller 44 for this purpose. In all events, the crank arm 42 is continuously engaged with the magnet bar 32 by means of the guide plate 45, end block 46 and slot 48 in the guide plate 45 so that the magnetic bar is reciprocated continually in the apparatus when the magnet bar is supported on the bearings 41. Also, the magnet bar 32 is lifted upwardly slightly from such bearings 41 and moved forwardly and upwardly through a limited arc once for each reciprocation of the crank arms 42 and 43.

Non-magnetic articles can be processed by the apparatus as the magnet bar 32 will engage and position them satisfactorily for some purposes. Of course, such bar 32 then could be made of any desired material.

Figs. 6 and 7 of the drawings best show that the pair of belts 38 are journalled at the discharge end of their paths of movement upon suitable sheaves 49 secured to a shaft 50 journalled on the frame 2. A second shaft 51 is journalled in the frame 1 adjacent and parallel to the shaft 50 and a drive sprocket 52 is carried by the shaft 50 and with a driven sprocket 53 being secured to the shaft 51. A suitable chain 54 connects between the sprockets 52 and 53 so as to drive the shaft 51 at a slightly reduced rate of speed with relation to the rotation of the shaft 50. Thus it will be seen that the sprocket 53 is slightly larger in diameter than the sprocket 52 to effect the desired speed reduction. The shaft 51 has suitable sheaves thereon which position a pair of belts 55 that are the delivery belts of the apparatus 1 of the invention. Such pair of belts 55 also are positioned by another pair of sheaves so as to maintain the belts 55 in desired closely spaced parallel relationship throughout their lengths. It will be seen that the belts 55 are positioned in alignment with the belts 38 and are spaced slightly therefrom. Thus in order to transfer cans from the pair of belts 38 over to the belts 55, a connector belt 56 is provided. Such connector belt 56 is positioned to overlap the pairs of belts 38 and 56 and the end sheaves positioning such belts, and is on the centerline of the pairs of belts. The delivery ends of the belts 38 are immediately adjacent the receiving ends of the belts 55 so that cans carried by the belts can be readily transferred from one pair of belts to the other. Normally the belt 56 is driven at substantially the same speed as the belts 38 and with a positioning sheave for the belt 56 being carried by the same shaft 50 as other sheaves used for positioning end loops of a pair of belts 38. Usually these sheaves on the common shaft 50 will be of substantially the same diameter to produce the desired equal rate of movement of such belts.

It thus will be seen that the cans C processed by the apparatus of the invention will be fed from the apparatus 1 by the pair of belts 55 and such belts are adapted to be driven at a desired rate of speed so that cans, which are in end abutting relationship will be fed from the apparatus continually and smoothly. The cans then are transferred over to a magnetic or other type of can sorting apparatus, one form of which is disclosed in my copending patent application Serial No. 551,308 filed December 6, 1955, now Patent No. 2,845,165 and which apparatus serves to align the cans with the open or top portions of the cans all being positioned in one direction insofar as the movement of the cans is concerned. The present apparatus discharges the cans in end abutting contact and does not have the cans with all open ends pointing in a common direction.

*Driving means*

Figure 3:
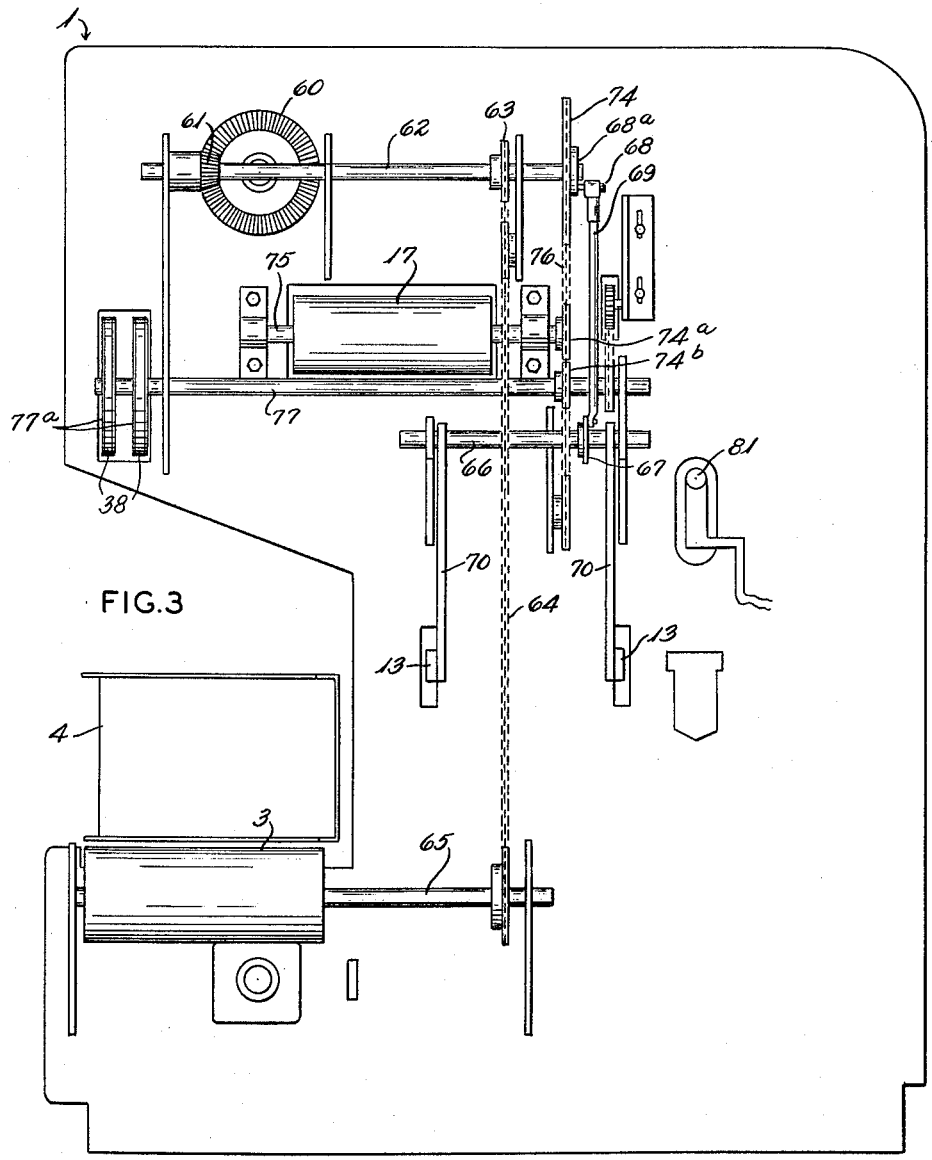
Fig. 3 is a right side elevation of the apparatus of Fig. 1 with the cover thereon removed.

Fig. 4 of the drawings best shows the main drive motor 57 for the apparatus 2 of the invention. The output shaft (not shown) of this motor 57 connects to and drives a jack shaft 58, extending the length of the frame 2 of the apparatus of the invention by conventional means (not shown). Such jack shaft 58 has sprockets 59 secured thereto around which the endless chains 5a for the conveyor 5 pass and engage so as to drive such conveyor 5 at a desired rate of speed. The jack shaft 58 protrudes from the frame 2 at one end of the apparatus, as shown in Fig. 3, and it has a crown gear 60 thereon that meshes with a spur, or pinion gear 61 on a shaft 62 that is journalled on and extends from front to rear of the frame 2 of the apparatus. Such shaft 62 has a drive sprocket 63 thereon around which a chain 64 passes for connection to a drive sprocket carried by a shaft 65 which forms one mounting shaft for the belt conveyor 3 used for feeding cans or other articles into the apparatus of the invention.

A drive for the shaker rods 13, by which the flails 11 are suspended, is provided by means of a short shaft 66 journalled on one end portion of the frame 2, as indicated in Fig. 3. Such shaft 66 has a crank 67 secured thereto. The crank 67 and shaft 66 in turn are oscillated by a crank pin 68 secured to a fly wheel 68a affixed to the shaft 62 adjacent one end thereof. The crank pin 68 has a link 69 connecting it to the crank 67 on the shaft 66 so by rotation of the wheel 68a, the shaft 66 can be caused to oscillate. The shaft 66 has lever arms 70 fixedly secured thereto, as by welding, so that such arms are caused to oscillate through a desired arc with arcuate movement of the control shaft 66. The arms 70 in turn are secured to the control rods 13 for the flails 11 so as to reciprocate them with drive of the jack shaft 58. At their opposite ends, the rods 13, on which the flails 11 are suspended, are positioned by links 71 which are secured to a connector shaft 72, see Fig. 4, which in turn is journalled in suitable bearings 73 on the frame 2. Hence, the desired vibratory action can be readily supplied to the rods 13 from the main drive motor 57 of the apparatus.

The collector belt 17 is driven at a desired high rate of speed with relation to the remainder of the apparatus by connecting a relatively large diameter drive sprocket 74 on the shaft 62 to a relatively small diameter drive sprocket 74a provided at one end of a shaft 75 on which the collector belt is positioned. The shaft 75 is suitably journalled on the frame 2. Chain 76 connects the sprockets 74 and 74a and also engages a driven sprocket 74b carried by a shaft 77 journalled on one end of the frame 2 of the apparatus. This shaft 77 carries suitable sheaves, or similar means, 77a thereon positioning one end of and driving each of the endless discharge belts 38.

The desired relative speeds of the collector belt 17 and the discharge belts 38 with relation to the remainder of the apparatus is secured by control of the number of teeth on the sprockets 74, 74a and 74b.

Fig. 6 best shows that the drive shaft 77 for the belts 38 also has a suitable sprocket (not shown) for a chain 78 connected thereto to control movement of the magnet bar unit in correlation with the operation of the conveyor 5. Such chain 78 extends to and suitably drives a shaft 79 to which the crank arm 43 is suitably secured. The shaft 79 also has a drive sprocket (not shown) provided thereon for a chain 80 that extends to and drives a shaft 81 on which the second crank arm 42 used for supporting the magentic bar and associated means is provided. The shafts 79 and 81 are suitably journalled on the frame 2.

By driving all of the portions of the apparatus from the main drive motor 57, it is possible to correlate the speed of the various components of the apparatus relatively readily and to effect the desired coordination between the different components of the apparatus. One important feature of the invention is that the collector belt 17 is caused to move relatively rapidly for can or other article concentrating purposes with the movement of the associated flights 6 over the surface of such belt. This collector belt must run the length of one of the flights 6 from the input end A of the apparatus to the discharge plate 21 while such flight is in association therewith. Furthermore, the crank arms 42 and 43 must be given one complete revolution for each discharge of articles from one of the flights 6 of the conveyor 5. Thus the apparatus is constructed and arranged so that the magnet bar 32 is in its top or uppermost position and is moving forwardly with relation to axial movement of the cans C along the belts 38 each time that a group of cans or other articles are caused to move down along the lip 21 of the discharge plate 18 for deposit on such magnet bar and associated means. Thus the magnet bar 32 will firmly grasp the cans or other articles while they are moving normally to their longitudinal axes and the magnet bar will then start the cans to move in an axial direction. By depositing the cans or other articles upon the pair of belts 38 which are held in fixed vertical positions by axial movement of the cans through the magnet bar 32, the cans are started off in their new path of movement without any relative movement between the various cans.

As a further safety precaution in the apparatus, a photoelectric cell 81 is provided at one end of the frame 2 of the apparatus and a beam projecting member 82 is provided at the other end for directing a light beam along a portion of the conveyor 5. This beam from the member 82 is directed upon the photoelectric cell 81 so that when any cans or other articles are improperly positioned upon the flights 6, the light beam will be interrupted and the photoelectric cell 81 is connected to suitable control means for shutting off the drive motor 57 at such time. Obviously any other correlated portions or machines used in association with the apparatus of the invention should be shut off at the same time by the control means provided and hence, all associated apparatus would be shut off simultaneously when any portion of the apparatus is functioning improperly.

From the foregoing, it will be seen that a novel method of and apparatus for sorting articles such as tin cans has been provided and that the objects of the invention are achieved.

While one complete embodiment of the invention has been disclosed herein, it will be appreciated that modification of this particular embodiment of the invention may be resorted to without departing from the scope of the invention as defined in the appended claims.

What is claimed is:

1. A method of handling cans or the like comprising randomly placing cans on a carrier, positioning the cans in a plurality of parallel rows with all cans in a row being in axial alignment, moving the rows of aligned cans through a predetermined path normal to the can axes, concentrating the cans in one row into axially abutting positions, discharging at least part of a row of axially abutted cans by movement normal to the axes thereof, and picking up the discharged axially abutted cans and moving them axially without appreciable change in their relative positions.

2. A method of handling cans or the like comprising continuously placing cans in a random manner on a carrier, rearranging the cans into a plurality of moving parallel rows with all cans in a row being in axial alignment, moving the rows of aligned cans through a predetermined path, concentrating the cans in one row at a point in the predetermined path of movement into abutting positions, discharging at least part of a row of axially abutted cans by movement normal to the axes thereof, and moving the row of axially abutted cans axially without appreciable change in relative position of the abutted cans.

3. A method of handling cans or the like comprising positioning cans in a plurality of parallel rows with all cans in a row being in axial alignment, moving the rows of aligned cans through a predetermined path, concentrating the cans in a row at a predetermined point in the path of movement into abutting aligned positions, discharging at least part of a row of axially abutted cans by movement normal to the axes thereof, and picking up the discharged axially abutted cans and moving them axially without appreciable change in relative position of the abutted cans.

4. A method of handling cans or the like comprising positioning cans in a plurality of parallel rows with all cans in a row being in axial alignment, moving the rows of aligned cans through a predetermined path, concentrating the cans in a row at a predetermined point in the path of movement into abutting aligned positions, and discharging at least part of a row of axially abutted cans by movement normal to the axes thereof.

5. Apparatus for sorting metal cans or similar articles and discharging them in axial alignment and comprising driven means including a conveyor and transversely extending flights thereon for positioning the articles in a plurality of parallel rows and moving the articles through the inner portion of an inverted C-shaped path normal to the axes of such articles, means for stopping the drive of said driven means if articles thereon are protruding improperly therefrom, driven belt means adjacent one portion of said driven means for supporting articles being propelled by said driven means over said driven belt means at one portion of the overhanging path of movement of said means, said driven belt means concentrating the articles thereon into end abutting contact, and means adjacent one portion of the path of said driven means for receiving concentrated end abutted articles therefrom.

6. Apparatus for sorting metal cans or similar articles and discharging them in axial alignment and comprising driven conveyor means for positioning the articles in a plurality of parallel rows and moving the articles through a path normal to the axes of such articles, driven belt means for gravity support of articles propelled by said driven conveyor means at one portion of the path of movement of said means, said driven belt means concentrating the articles thereon into end abutting contact, and means for receiving concentrated end abutted articles discharged from said driven conveyor means.

7. Apparatus for sorting cans or similar articles and positioning them in alignment and comprising a driven endless conveyor having a plurality of spaced parallel transversely extending article carrying flights thereon, means positioning said conveyor in inverted C-shape to move clockwise therearound, means for depositing articles randomly onto said conveyor at a lower but inner portion thereof, reciprocating flail means positioned adjacent said flights of said conveyor where articles are randomly deposited thereon for moving articles on said conveyor and not lying down intermediate adjacent flights to attempt to so position the articles, said conveyor, flights and articles being correlated and positioned to have gravity pull any standing article therefrom as said conveyor advances past said reciprocating means, means for retaining properly laid articles on said conveyor as it advances past said reciprocating flail means, and means adjacent one portion of said conveyor for receiving discharged axially aligned articles from said conveyor.

8. Apparatus for sorting cans or similar articles and positioning them in alignment and comprising a driven endless conveyor having a plurality of spaced parallel article carrying flights thereon, means positioning said conveyor in inverted C-shape to move therearound, means for depositioning articles randomly on said conveyor at a lower but inner portion thereof, reciprocating flail means for contacting and moving articles on said conveyor and not lying down intermediate adjacent flights to attempt to so position the articles, said conveyor, flights and articles being correlated and positioned to have gravity pull any standing articles therefrom as said conveyor advances past said reciprocating flail means, means for retaining properly laid articles on said conveyor as it advances past said reciprocating flail means, means for concentrating articles on one flight of said conveyor into aligned and end abutting relation at a predetermined point in the path of movement thereof where said conveyor is in a suspended position, and means for receiving discharged concentrated aligned end abutted articles.

9. Apparatus as in claim 6 wherein said receiving means extend only a part of the possible length of a row of articles in the apparatus, and guide means are provided adjacent said driven conveyor means to retain articles thereon and combine with said receiving means to extend the possible length of a row of articles whereby some articles in a row may not be discharged but may pass with said driven conveyor means for a further orbital cycle therewith.

10. Apparatus for sorting cans or similar articles and positioning them in alignment and comprising a driven endless conveyor having a plurality of spaced parallel article carrying flights thereon, articles being randomly deposited onto said conveyor at a portion thereof, means for contacting and moving articles on said conveyor and not lying down intermediate adjacent flights to attempt to so position the articles, means for retaining properly laid articles on said conveyor as it advances past said article contact means for continued movement therewith, means for concentrating articles on one flight of said conveyor into aligned and end abutting relation at a predetermined point in the path of movement thereof where said conveyor is in a suspended position, and means for receiving discharged aligned end abutted articles from said conveyor.

11. In apparatus for sorting cans or similar articles and positioning them in alignment, a driven endless conveyor having a plurality of spaced parallel transversely directed article carrying flights thereon, articles being randomly deposited onto said conveyor at a portion thereof, flail means for contacting and moving articles on said conveyor and not lying down intermediate adjacent flights to attempt to so position the articles, means for positioning said flail means adjacent the portion of the said conveyor having randomly positioned articles thereon, and means for moving said positioning means for causing movement of said flail means.

12. In apparatus for sorting cans or similar articles and positioning them in alignment, a driven endless conveyor having a plurality of spaced parallel transversely directed article carrying flights thereon, articles being randomly deposited onto said conveyor at a portion thereof, and flail means for contacting and moving articles on said conveyor and not lying down intermediate adjacent flights to attempt to so position the articles.

13. Apparatus for sorting cans or similar articles and positioning them in alignment and comprising a driven endless conveyor having a plurality of spaced parallel article carrying flights thereon, means for contacting and moving articles on said conveyor and not lying down intermediate adjacent flights to attempt to so position the articles, magnetic means for receiving discharged aligned articles from said conveyor, said conveyor automatically and operatively discharging articles therefrom onto said magnetic means by movement in a direction normal to the longitudinal axes of said articles, a pair of spaced parallel delivery belts, and positioning means to move said magnetic means through an orbit and discharge articles from said magnetic means onto said discharge belts.

14. Apparatus for sorting tin cans or similar magnetic articles and positioning them in alignment and comprising a driven endless conveyor having a plurality of spaced parallel article carrying flights thereon, articles being positioned in axial alignment on said flights of said conveyor, magnetic means for receiving discharged axially aligned articles from said conveyor, said conveyor automatically discharging articles therefrom when moving in a direction normal to the longitudinal axes of said articles, a pair of spaced parallel delivery belts, and positioning means to move said magnetic means through an orbit and discharge articles from said magnetic means onto said discharge belts which engage spaced peripheral portions of said articles.

15. Apparatus for sorting cans or similar articles and positioning them in alignment and comprising a driven endless conveyor having a plurality of spaced parallel article carrying flights thereon, articles being positioned in axial alignment on said flights of said conveyor, means for receiving discharged axially aligned articles from said conveyor, said conveyor automatically discharging articles therefrom by gravity action when moving in a direction normal to the longitudinal axes of said articles, endless discharge means, and positioning means for said receiving means to move such means through an orbit and deposit discharged articles onto said discharge means.

16. In apparatus for sorting metallic cans or similar magnetic articles, endless driven conveyor means for intermittently discharging a plurality of axially aligned articles by movement normal to the axes thereof, a magnetic bar, means positioning said magnetic bar to engage said articles as discharged from said conveyor means, and a pair of driven spaced endless belt means on opposite lateral sides of said magnetic bar, said positioning means for said magnetic bar being adapted to move it down between said belt means to deposit said articles thereon for movement axially of said articles.

17. In apparatus for sorting cans or similar articles, the combination comprising means for retaining the articles in a plurality of parallel rows, means for propelling said parallel rows of articles in a direction normal to the longitudinal axes thereof, an endless belt, means positioning said belt for support of a row of said articles while retained in alignment by said retaining means and while being propelled by said propelling means, and means for driving said belt for moving articles thereon into end abutting contact.

18. In apparatus for sorting cans or similar articles, the combination comprising means for positioning the articles in a plurality of parallel rows and for propelling said parallel rows of articles in a direction normal to the longitudinal axes thereof, an endless belt positioned for support of a row of said articles while they are retained in alignment and propelled across said belt by said positioning means and means for driving said belt for moving articles supported thereon into end abutting contact.

19. Apparatus as in claim 6 wherein said driven conveyor means includes flights having angle means for normally engaging and carrying articles thereon, secondary angles secured to back portions of said angle means for engaging articles normally carried by the preceding flight in the conveyor means and propelling them through a portion of the path of said conveyor means, and resilient bead means carried by the normally upper edges of said flights to protect articles striking such edges.

20. Apparatus as in claim 6 wherein said driven conveyor means includes flights having angle means for engaging articles and moving them with said conveyor, and resilient bead means carried by the normally upper edges of said flights to protect articles striking such edges.

21. In apparatus for sorting cans or similar articles, the combination comprising means for positioning the articles in a plurality of parallel rows, conveyor means for moving said positioning means and parallel rows of articles through an endless path in a direction normal to the longitudinal axes thereof, discharge means for said conveyor means for receiving articles from only a portion of the length of said positioning means, and guide means for retaining said articles on the remainder of the lengths of said positioning means for further passage through the apparatus.

22. In apparatus for sorting cans or similar articles, the combination comprising flight means for positioning the articles in a plurality of parallel rows, conveyor means engaging said flight means for moving parallel rows of articles through an endless path in a direction normal to the longitudinal axes thereof, said flights being adapted to receive only end aligned articles thereon, driven belt means at one portion of the path of said conveyor and flight means and moving axially of said flight means and engaging articles thereon to move them into end abutting contact at corresponding ends of said flights, discharge means for said conveyor and flight means for receiving articles from only a portion of the length of said flights at the article concentrated ends thereof, and guide means for retaining said articles on the remainder of the lengths of said flights for a further cycle through the apparatus.

23. A method of handling articles such as cans comprising placing articles in a random manner on a carrier, rearranging the articles into a plurality of parallel rows with all articles in a row being in axial alignment, moving the rows of aligned articles on the carrier through a predetermined path normal to the axes of the articles, concentrating the articles in the rows at a point in the path of movement into end abutting contact adjacent one lateral margin of the carrier, discharging only a maximum predetermined number of articles from the carrier at a point in the path of article movement, and retaining any excess undischarged articles in axial alignment and again moving such articles through the said predetermined path of movement for further processing.

24. In apparatus for sorting cans or similar articles and positioning them in alignment, a driven endless conveyor having a plurality of spaced parallel transversely directed article carrying flights thereon and secured thereto, said conveyor being positioned to have a substantially horizontally extending section in its path of movement, articles being randomly deposited onto said conveyor at said section thereof, flail means positioned above but immediately adjacent the substantially horizontally extending section of said conveyor for contacting and moving articles on said conveyor and not lying down intermediate adjacent flights to attempt to so position the articles, and means operatively connected to said flail means to move them transversely of said conveyor.

25. Apparatus for sorting metal cans or similar articles and discharging them in axial alignment and comprising driven means for positioning the articles in a plurality of parallel rows and moving the articles through a path normal to the axes of such articles and discharging them by gravity action, means adjacent one point in the path of said driven means for engaging and receiving axially aligned articles from said driven means as discharged therefrom, a pair of parallel spaced belt means for engaging peripheral portions of the articles and moving them in an axial direction, said belt means being adjacent said engaging and receiving means for picking up and moving articles therefrom, and means for intermittently raising and lowering said engaging and receiving means with relation to said belt means to receive articles thereon and to deposit articles on said belt means for movement thereby.

26. Apparatus for sorting cylindrical articles comprising a driven conveyor having transversely extending flights thereon, means positioning said conveyor for movement through an endless inverted C-shape path, articles being randomly deposited on the lower inside course of said conveyor to be retained thereon by gravity, flail means, and driven means suspending said flail means to position them adjacent the lower inside course of said conveyor and to be moved transversely thereof to strike articles extending beyond a predetermined distance from said conveyor and endeavor to move such articles to unoccupied portions of said conveyor.

27. Apparatus for sorting cylindrical articles comprising a driven conveyor having transversely extending flights thereon, means positioning said conveyor for movement through an endless inverted C-shape path, articles being randomly deposited on the lower inside course of said conveyor to be retained thereon by gravity, flail means including freely suspended flail plates, and driven means secured to said flail means to position said flail plates adjacent the lower inside course of said conveyor and extending longitudinally thereof to be moved transversely thereof to strike articles extending beyond a predetermined distance from said conveyor and endeavor to move such articles to unoccupied portions of said conveyor.

28. Apparatus for sorting cylindrical articles comprising a driven conveyor having transversely extending flights thereon, means positioning said conveyor for movement through an endless inverted C-shape path, articles being randomly deposited on the lower inside course of said conveyor to be retained thereon by gravity, flail means, driven means suspending said flail means to position them adjacent the lower inside course of said conveyor and to be moved transversely thereof to strike articles extending beyond a predetermined distance from said conveyor and endeavor to move such articles to unoccupied portions of said conveyor, and means supporting the articles while engaged with and moved by said conveyor flights as said conveyor moves through the upper inside course of its C-shaped path.

References Cited in the file of this patent

UNITED STATES PATENTS

| | | |
|---|---|---|
| Re. 19,375 | Bronander | Nov. 20, 1934 |
| 804,459 | Ellingwood | Nov. 14, 1905 |
| 1,310,128 | Meyer | July 15, 1919 |
| 1,457,352 | Dreher | June 5, 1923 |
| 1,744,363 | Chapman | Jan. 21, 1930 |
| 1,972,489 | Rideout | Sept. 4, 1934 |
| 2,102,248 | Yeakel | Dec. 14, 1937 |
| 2,555,193 | Johnson | May 29, 1951 |
| 2,671,550 | Schultz | Mar. 9, 1954 |
| 2,681,723 | McCabe | June 22, 1954 |
| 2,717,729 | Page | Sept. 13, 1955 |
| 2,750,024 | Gurewitz | June 12, 1956 |
| 2,769,522 | Pfeiffer | Nov. 6, 1956 |